(12) United States Patent
Getzin

(10) Patent No.: US 10,255,254 B1
(45) Date of Patent: Apr. 9, 2019

(54) DOCUMENT OBJECT MODEL DATA EXTRACTION USING HTML TAG IDENTIFIER

(71) Applicant: Google Inc., Mountain View, CA (US)

(72) Inventor: Jeffrey Getzin, Boonton, NJ (US)

(73) Assignee: Google LLC, Mountain View, CA (US)

( * ) Notice: Subject to any disclaimer, the term of this patent is extended or adjusted under 35 U.S.C. 154(b) by 68 days.

(21) Appl. No.: 15/091,363

(22) Filed: Apr. 5, 2016

Related U.S. Application Data

(63) Continuation of application No. 13/562,231, filed on Jul. 30, 2012, now abandoned.

(51) Int. Cl.
| | |
|---|---|
| G06F 17/00 | (2006.01) |
| G06F 17/22 | (2006.01) |
| H04L 29/08 | (2006.01) |
| G06F 3/0482 | (2013.01) |
| G06F 17/21 | (2006.01) |

(52) U.S. Cl.
CPC ........ *G06F 17/2247* (2013.01); *G06F 3/0482* (2013.01); *G06F 17/218* (2013.01); *H04L 67/02* (2013.01)

(58) Field of Classification Search
CPC .. G06Q 30/277; G06F 17/218; G06F 17/2247
See application file for complete search history.

(56) References Cited

U.S. PATENT DOCUMENTS

| | | |
|---|---|---|
| 7,506,359 B1 | 3/2009 | Ling |
| 8,181,156 B1 | 5/2012 | Bobykin et al. |
| 2002/0046099 A1 | 4/2002 | Frengut et al. |
| 2002/0152283 A1 | 10/2002 | Dutta et al. |
| 2003/0101451 A1 | 5/2003 | Bentolila et al. |
| 2003/0130894 A1 | 7/2003 | Huettner et al. |
| 2008/0153468 A1 | 6/2008 | Reilly |
| 2008/0281974 A1 | 11/2008 | Slothouber et al. |
| 2009/0187486 A1* | 7/2009 | Lefenfeld .............. G06Q 30/02 705/14.73 |
| 2009/0222510 A1 | 9/2009 | Van Riel |
| 2009/0239510 A1 | 9/2009 | Sennett et al. |
| 2009/0287572 A1 | 11/2009 | Whelan |

(Continued)

OTHER PUBLICATIONS

U.S. Office Action on U.S. Appl. No. 13/562,231 dated Oct. 1, 2014.

(Continued)

*Primary Examiner* — Andrew T McIntosh

(74) *Attorney, Agent, or Firm* — Foley & Lardner LLP

(57) ABSTRACT

Document object model (DOM) extraction using a hypertext markup language (HTML) tag identifier is described. A web browser executing on a computing device receives content preference data input via a content preferences menu of the web browser. The web browser adds, to the DOM of an electronic resource, the HTML tag identifier that indicates the content preference data. The web browser renders the electronic resource with the HTML tag identifier. A content server parses the electronic resource rendered by the web browser to identify the HTML tag identifier, and selects the content item corresponding the content preference data indicated by the HTML tag identifier. The web browser receives the content item and renders the content item for display on a display device of the computing device.

20 Claims, 4 Drawing Sheets

(56) References Cited

U.S. PATENT DOCUMENTS

| | | |
|---|---|---|
| 2009/0313654 A1 | 12/2009 | Paila et al. |
| 2009/0319355 A1* | 12/2009 | Sinyagin ............ G06Q 30/0224 |
| | | 705/14.25 |
| 2010/0106568 A1 | 4/2010 | Grimes |
| 2010/0125491 A1* | 5/2010 | Elliott .................... G06Q 30/02 |
| | | 705/14.4 |
| 2010/0287134 A1* | 11/2010 | Hauser ............. G06Q 10/06375 |
| | | 706/54 |
| 2010/0287580 A1* | 11/2010 | Harding ............. G06Q 30/0247 |
| | | 725/14 |
| 2011/0252160 A1 | 10/2011 | Wu |
| 2011/0288913 A1* | 11/2011 | Waylonis ........... G06Q 30/0241 |
| | | 705/14.4 |
| 2012/0054596 A1* | 3/2012 | Kroger ................ G06F 17/3089 |
| | | 715/234 |

OTHER PUBLICATIONS

U.S. Office Action on U.S. Appl. No. 13/562,231 dated Mar. 11, 2014.
U.S. Office Action on U.S. Appl. No. 13/562,231 dated Apr. 2, 2015.
U.S. Office Action on U.S. Appl. No. 13/562,231 dated Sep. 9, 2015.
U.S. Office Action on U.S. Appl. No. 13/562,231 dated Jan. 11, 2016.

* cited by examiner

DOCUMENT OBJECT MODEL DATA EXTRACTION USING HTML TAG IDENTIFIER

CROSS-REFERENCE TO RELATED APPLICATION

This application claims the benefit of priority under 35 U.S.C. § 120 as a continuation of U.S. patent application Ser. No. 13/562,231, filed Jul. 30, 2012, which is hereby incorporated herein by reference in its entirety.

TECHNICAL FIELD

The disclosure relates generally to the field of content management, and, in particular, relate to systems and methods for matching content to user interests.

BACKGROUND

The Internet provides access to a wide variety of content. The ability to search that content and provide intelligent search results to a user continues to be a challenge. Moreover, providing content related to services or items that the user would like to purchase can be beneficial to both the users and the content providers.

Content providers decide which content is displayed using various advertising management tools. These tools also allow a content provider to track the performance of various content items or content campaigns. The parameters used to determine when to display a particular content item can also be changed using content management tools.

SUMMARY

A method of managing content on a web browser of a user device includes, but is not limited to any one or combination of: (i) receiving, with the browser, content preferences from a user; (ii) storing the content preferences; (iii) requesting a resource from a resource server; (iv) receiving data representing the resource from the resource server; (v) rendering the data for presenting the resource on the user device; (vi) adding preference data having a predetermined format to a document object model (DOM) of the resource, the preference data corresponding to the stored content preferences; (vii) requesting a content item from a content server, the request including the preference data corresponding to the stored content preferences; and (viii) receiving, from the content server, a selected content item for presentation with the resource.

In various implementations, the content preferences include a maximum number of content items for presentation with the resource.

In various implementations, the content preferences include categories of content subject matter for presentation with the resource.

In various implementations, the content preferences are stored on the user device.

In some implementations, the content preferences are stored in a settings file for the browser.

In some implementations, the content preferences are stored in a system registry of the user device.

In various implementations, the content preferences are stored on a remote server.

In various implementations, the content item comprises one or more advertisements and the content preferences include advertisement preferences.

In some implementations, the advertisement preferences include types of advertisements for presentation with the resource.

In some implementations, the types of advertisements include at least one of image advertisements, video advertisements, animated image advertisements, and text advertisements.

In some implementations, the advertisement preferences include a maximum number of advertisements of each type of advertisements for presentation with the resource.

An apparatus for managing content on a web browser of a user device includes at least one memory device that stores processor-executable instructions and at least one processor, coupled to the at least one memory device, that executes the processor-executable instructions to: receive, with the browser, content preferences from a user; store the content preferences; request a resource from a resource server; receive data representing the resource from the resource server; render the data for presenting the resource on the user device; add preference data having a predetermined format to a document object model (DOM) of the resource, the preference data corresponding to the stored content preferences; request a content item from a content server, the request including the preference data corresponding to the stored content preferences; and receive, from the content server, a selected content item for presentation with the resource.

At least one tangible computer-readable storage medium encoded with instructions that, when executed by a processor, perform a method of managing content on a web browser of a user device. The method includes, but is not limited to any one or combination of: receiving, with the browser, content preferences from a user; storing the content preferences; requesting a resource from a resource server; receiving data representing the resource from the resource server; rendering the data for presenting the resource on the user device; adding preference data having a predetermined format to a document object model (DOM) of the resource, the preference data corresponding to the stored content preferences; requesting a content item from a content server, the request including the preference data corresponding to the stored content preferences; and receiving, from the content server, a selected content item for presentation with the resource.

A method of managing content on a server includes (but is not limited to any one or combination of): (i) receiving a request for a content item for presentation with a resource, the request including preference data having a predetermined format in a document object model (DOM) of the resource, the preference data corresponding to content preferences of a user of a user device; (ii) parsing the preference data to obtain the content preferences of the user; (iii) selecting a content item based on the content preferences of the user; and (iv) providing the selected content item to the user device for presentation with the resource.

In various implementations, the predetermined format of the preference data comprises a predetermined identifier. The parsing includes: searching for the predetermined identifier in the preference data; and extracting data corresponding to the predetermined identifier to obtain the content preferences of the user.

In various implementations, the content item comprises one or more advertisements and the content preferences include advertisement preferences.

In some implementations, the advertisement preferences include types of advertisements for presentation with the resource.

In some implementations, the types of advertisements include at least one of image advertisements, video advertisements, animated image advertisements, and text advertisements.

An apparatus for managing content on a server includes at least one memory device that stores processor-executable instructions and at least one processor, coupled to the at least one memory device, that executes the processor-executable instructions to: receive a request for a content item for presentation with a resource, the request including preference data having a predetermined format in a document object model (DOM) of the resource, the preference data corresponding to content preferences of a user of a user device; parse the preference data to obtain the content preferences of the user; select a content item based on the content preferences of the user; and provide the selected content item to the user device for presentation with the resource.

At least one tangible computer-readable storage medium encoded with instructions that, when executed by a processor, perform a method of managing content on a web browser of a user device. The method includes, but is not limited to any one or combination of: receiving a request for a content item for presentation with a resource, the request including preference data having a predetermined format in a document object model (DOM) of the resource, the preference data corresponding to content preferences of a user of a user device; parsing the preference data to obtain the content preferences of the user; selecting a content item based on the content preferences of the user; and providing the selected content item to the user device for presentation with the resource.

DETAILED DESCRIPTION

In various implementations, content (e.g., advertisements) may be provided (e.g., with search results and/or other content) based on user preferences for content. Content items may be selected and served in response to scanning web page content to determine which content item is appropriate to serve for that page. The content preferences may be rendered into the web page automatically so that a content management system can obtain the content preferences and use the content preferences to determine which content item to provide the user.

Figure 1:
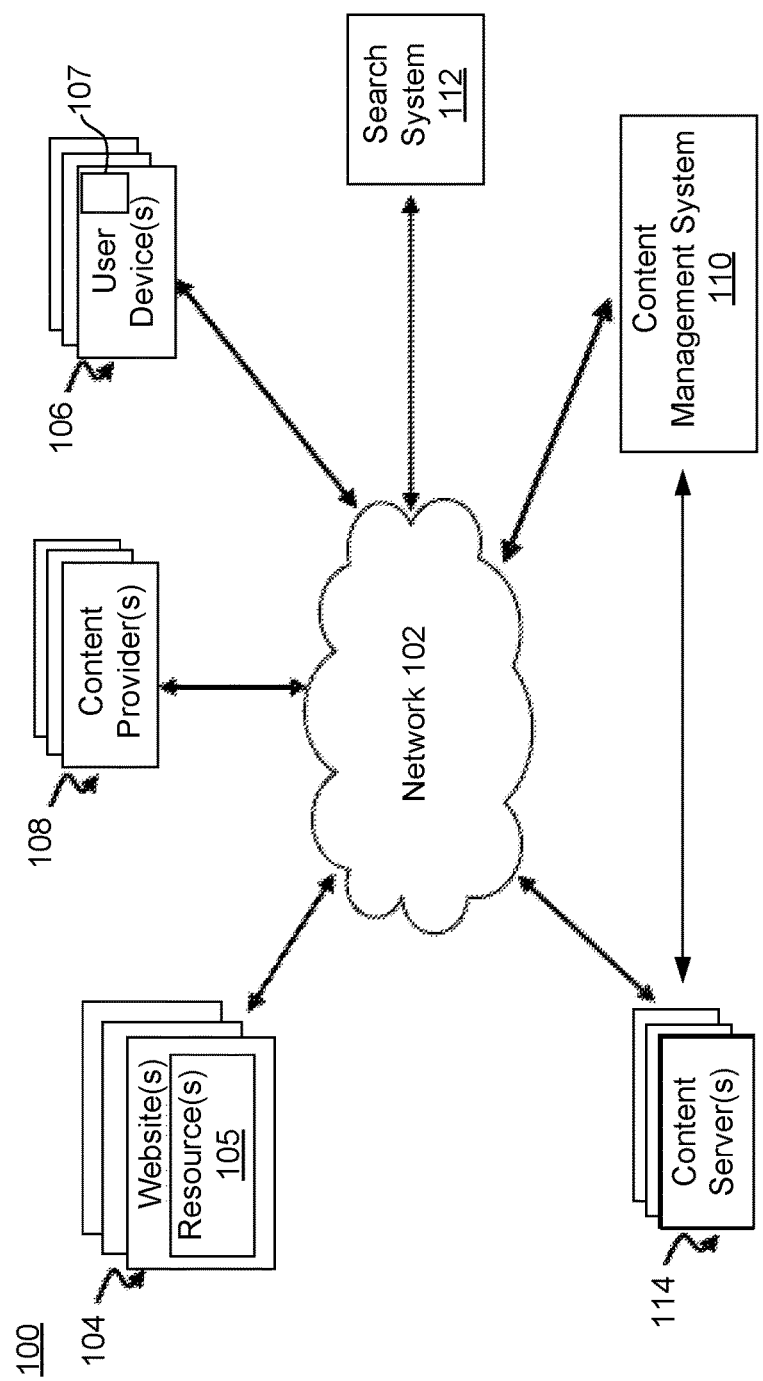
FIG. 1 is a block diagram of an environment in which a content management system manages content according to various implementations of the disclosure.

FIG. 1 is a block diagram of an environment in which a content management system manages content-providing services. The environment 100 includes a network 102, such as a local area network (LAN), a wide area network (WAN), the Internet, or a combination thereof. The network 102 connects websites 104, user devices 106, content providers 108, and a content management system 110. The environment 100 may include many thousands of websites 104, user devices 106, and content providers 108.

The website 104 is one or more resources 105 associated with a domain name and hosted by one or more servers. For instance, a website may be a collection of web pages formatted in hypertext markup language (HTML) that can contain text, images, multimedia content, and programming elements, such as scripts.

The resource 105 is any data that can be provided over the network 102. The resource 105 is identified by a resource address that is associated with the resource 105, such as a uniform resource locator (URL). The resource 105 may include web pages, word processing documents, portable document format (PDF) documents, images, video, programming elements, interactive content, feed sources, and/or any other type of content. The resource 105 can include content, such as words, phrases, images, and sounds, which may include embedded information (such as meta-information in hyperlinks) and/or embedded instructions (such as JavaScript™ scripts).

The user device 106 is an electronic device that is controllable by a user and is capable of requesting and receiving resources (e.g., 105) over the network 102. User devices 106 may include, but are not limited to, personal computers, mobile communication devices, and other devices that can send and receive data over the network 102. The user device 106 typically includes a user application, such as a web browser 107, to facilitate the sending and receiving of data over the network 102. The user device 106 may also be referred to as a computing device.

The user device 106 can request the resources 105 from the website 104 (or other resource server). In turn, data representing the resource 105 can be provided to the user device 106 for presentation by the user device 106. The data representing the resource 105 can include data specifying a portion of the resource 105 or a portion of a user display (e.g., a presentation location of a pop-up window or in a slot of a web page) in which a content item or other sponsored content item can be presented. These specified portions of the resource 105 or user display may be referred to as content slots. In some implementations, "content" or "content items" may refer to advertisements, and "content item" may refer to an advertisement. In such implementations, for instance, "content provider" may refer to advertisers or the like.

To facilitate searching of the vast number of resources 105 accessible over the network 102, the environment 100 can include a search system 112 that identifies the resources 105 by crawling and indexing the resources provided on the websites 104. Data about the resources can be indexed based on the resource with which the data is associated. The indexed and, optionally, cached copies of the resources are stored in a search index (not shown).

The user device 106 can submit search queries (e.g., via the browser 107) to the search system 112 over the network 102. In response, the search system 112 accesses the search index to identify resources that are relevant to the search query. In some implementations, a search query includes one or more keywords. The search system 112 identifies the relevant resources 105 in the form of search results and returns the search results to the user device 106 in search results pages. A search result is data generated by the search system 112 that identifies the resources 105 that are responsive to a particular search query, and includes a link to the resource 105. For instance, a search result can include a web page title, a snippet of text or a portion of an image extracted from the web page, a rendering of the resource, and the URL of the web page. Search results pages can also include one or more content slots in which one or more content items can be presented.

A search result page can be sent with a request from the search system 112 for the web browser 107 of the user device 106 to set an HTTP (HyperText Transfer Protocol) cookie. A cookie can represent, for example, a particular user device 106 and a particular web browser 107. For example, the search system 112 includes a server that replies to the query by sending the search results page in an HTTP response. This HTTP response includes instructions (e.g., a set cookie instruction) that cause the browser 107 to store a cookie for the site hosted by the server or for the domain of the server. If the browser 107 supports cookies and cookies are enabled, every subsequent page request to the same server or a server within the domain of the server will include the cookie. The cookie can store a variety of data, including a unique or semi-unique identifier. The unique or semi-unique identifiers are anonymized and are not connected with user names. Because HTTP is a stateless protocol, the use of cookies allows an external service, such as the search system 112 or other system, to follow particular actions and status of a user over multiple sessions. A user may, at any time, opt out of allowing user actions to be followed, for example, by disabling cookies in the browser 107 settings. According to various implementations, the search system 112 does not follow user identifying information. In some implementations, a user may be required to opt in to enable user actions to be followed.

When a resource 105 is requested by the user device 106, the content management system 110 receives a request for a content (one or more content items) to be provided with the resource 105. The request for content can include characteristics of the content slots that are defined for the requested resource 105 or search results page and can be provided to the content management system 110. For example, a reference (e.g., URL) to the resource 105 for which the content slot is defined, a size of the content slot, a position of the content slot within the resources, and/or media types that are available for presentation in the content slot can be provided to the content management system 110. Similarly, keywords associated with a requested resource ("resource keywords") or a search query for which search results are requested can also be provided to the content management system 110 to facilitate identification of content items that are relevant to the resource 105 or search query.

Using data included in the request for content, the content management system 110 can select one or more content items that are eligible to be provided in response to the request ("eligible content item(s)" or "candidate content item(s)"). For example, the eligible content items may include content items having characteristics matching the characteristics of content slots and that are identified as relevant to specified resource keywords or search queries. In some implementations, content items having one or more keywords that match the resource keywords or the search query are selected as the eligible content items by the content management system 110.

The content management system 110 may select an eligible content item for each content slot of the resource 105. The resource 105 or search results page may be received by the user device 106 for presentation to the user, for instance on the browser 107. In some implementations, the selected content item may be delivered to the user device 106 via one or more content servers 114.

The content providers 108 can submit, to the content management system 110, campaign parameters (e.g., matching keywords and corresponding bids) that are used to control distribution of content items. The content providers 108 can access the content management system 110 to monitor performance of the content items that are distributed using the campaign parameters. For example, a content provider 108 can access a campaign performance report that provides a number of impressions (e.g., presentations), selections (e.g., clicks), and conversions (e.g., converting impressions into desired actions) that have been identified for the content items.

The campaign performance report can also provide a total cost, a cost-per-click, and other cost measures for the content items over a specified period. For example, a content provider 108 may access a performance report that specifies that content items distributed using the phrase match keyword "hockey" have received 1,000 impressions (e.g., have been presented 1,000 times), have been selected (e.g., clicked) 20 times, and have been credited with 5 conversions. Thus, the phrase match keyword "hockey" can be attributed with 1,000 impressions, 20 clicks, and 5 conversions.

One example of online content providing offers pay-per-click (PPC) content providing, cost-per-thousand (CPM) content providing, and site-specific content providing for text, banner, rich-media content, and/or the like. The program may include local, national, and international distribution. The text content can be short, for example comprising one headline of 25 characters and two additional text lines of 35 characters each. Image content can be one of several different Interactive Advertising Bureau (IAB) standard sizes.

In some implementations in which the content-providing campaign implements PPC content providing, content providers 108 may select words that should trigger their content items and the maximum amount they will pay per click. When a user searches on a search engine, content items for relevant words may appear as "sponsored links" on the (right or left) side of the page, and sometimes above or below the main search results. In some implementations, content items can appear on any portion of a page. The ordering of the paid-for listings may depend on other content providers' bids (PPC) and factors such as the "quality score" of all content items shown for a given search. In some implementations, the content management system 110 may determine the factors based on historical click-through rates (CTR), predicted click-through rates (pCTR), relevance of a content provider's content item text and keywords, a content provider's account history, and other relevance factors. The quality score may also be used to set the minimum bids for a content provider's keywords. The minimum bid may take into consideration the quality of the landing page as well, which may include the relevancy and originality of content, navigability, transparency into the nature of the business, and/or the like.

In some implementations, a "user" may refer to any company, organization, partnership, individual, agent, or entity that is involved in online content providing. Thus, in some implementations "user" and "content provider" can be used interchangeably. Keyword coverage refers to the number of searches done by "search engine users" that result in a paid result—a content item—being displayed. For example, 50% of searches conducted on a search engine may result in a paid content item being displayed. Out of that, 1% of the searches may result in a specific content provider's URL being provided. In general, the online content provider's goal is to have its content item(s) appear on a display page after as many relevant searches as possible. One way a content provider 108 can extend their keyword coverage is by purchasing additional keywords, thus increasing the likelihood that their content item(s) will appear on displays of search results. The number of paid results per keyword can vary, and where a URL ranks among the paid results may depend on several factors, including relevancy and the keyword purchase price.

There are several ways a content provider 108 may select keywords to purchase. For example, a content provider 108 may select a group of keywords that define the products, services, or content the content provider 108 offers on its web page. The content provider 108 may try to expand its keyword selection by selecting all synonyms, or by selecting keywords that are related, in some manner, to the products, services, or content the content provider 108 offers on its web page. The content provider 108 may try to optimize its selection of keywords by monitoring how effective each keyword is. For example, the content provider 108 may use a tool that records the number of times a purchased keyword is entered into a search engine and the number of times that results in the content provider's web page being viewed.

Figure 2:
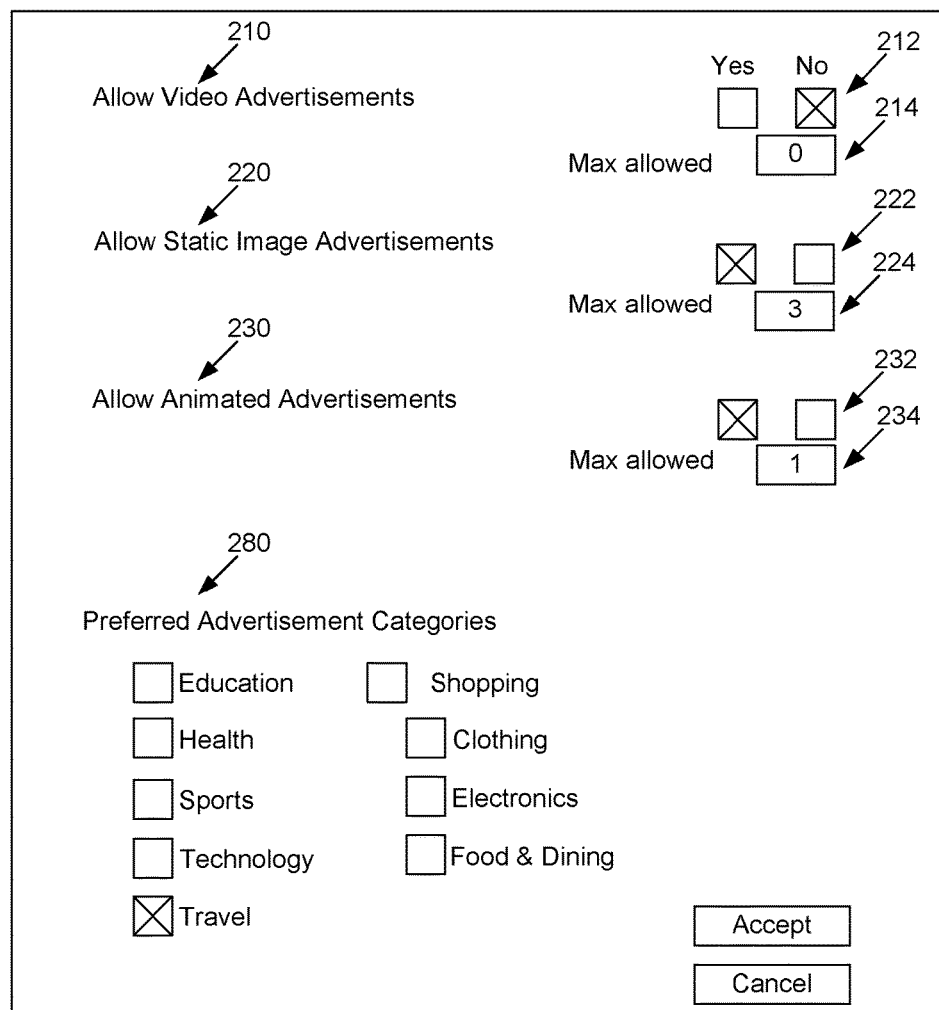
FIG. 2 is an illustrative menu for providing content preferences according to various implementations of the disclosure.

With reference to FIGS. 1-2, in various implementations, content items (e.g., advertisements) may be provided with resources (e.g., search results and/or web pages) based on user preferences for content items.

In some implementations, the browser 107 is configured to receive user preferences for content items. The user preferences (also referred to as content preferences) may be provided to the browser 107 in a settings (or preferences or options) menu that allows a user to configure various aspects (e.g., homepage, default download folder, tab settings, privacy settings, etc.) of his or her web-browsing experience. The settings menu may include a content preference menu 200 for allowing the user to input the user preferences for content items. In other implementations, the user preferences may be provided to the browser 107 in any other suitable manner, for example, during installation or use of the browser 107 (e.g., questionnaire, survey, etc.), and/or the like.

In some implementations, the user preferences may relate to (but are not limited to) types of content items. For instance, for implementations in which the content is one or more advertisements, the user preferences may include types of advertisements the users prefers (or wishes to avoid) (e.g., video advertisements 210, static image advertisements 220, animated image advertisements 230, text advertisements, etc.), number of advertisements per page 214, 224, 234, advertisement category subject matter 280 preferred (or the be avoided) (e.g., travel-related advertisements), and/or the like. Other preferences may include, but are not limited to, low-bandwidth advertisements, accessible content (e.g., for disabled users), advertisement formats (e.g., Flash, Windows Video, etc.), adult content, and/or the like.

In some implementations, the provided user preferences may be stored locally on the user device 106. For example, the user preferences may be stored with (or separate from) other settings for the browser 107 (e.g., homepage, default download folder, tab settings, privacy settings, etc.), such as in a settings file, a system registry for the user device 106, and/or the like. In other implementations, the user preferences may be stored on a remote database (e.g., content management system 110) to allow other devices (e.g., 106) associated with the user to access and/or implement the remotely stored user preferences. In other implementations, the locally stored user preferences (e.g., in a settings file, system registry, etc.) may be accessible by other devices (e.g., 106) associated with the user to access and/or implement the locally stored user preferences.

According to various implementations, when a resource 105, such as a web page or search results, is requested by the browser 107, the browser 107 requests the resource 105 from the website 104. In turn, data representing the resource 105 can be provided to the browser 107 for presentation (rendering) by the browser 107.

The data representing the resource 105 may include data (content slots) specifying a portion of the resource 105 or a portion of a user display associated with the user device 106 (and/or the browser 107) (e.g., a presentation location of a pop-up window or in a slot of the resource 105) in which content items (e.g., advertisements) or other sponsored content items can be presented. According to various implementations, such content items may be selected based on the provided (stored) user preferences, for instance, as input in the content preference menu 200.

In particular implementations, the browser 107 may be configured to add preference data that corresponds to the provided user preferences to the rendered resource (e.g., before, during, or after rendering the resource 105). The data may have a predetermined format to allow the content management system 110 to locate or otherwise access the corresponding user preferences. In particular, the browser 107 may render a first tag, such as a <div> tag (or any other suitable HTML tag identifier or other tag identifier), into a DOM (Document Object Model) of the resource 105 to allow the content management server 110 to locate or otherwise access the corresponding user preferences in the DOM. For instance, the browser 107 may render the <div> tag following a <body> tag as shown in Example A (which is based on the user preferences of FIG. 2). The first tag may have a predetermined identifier (tag ID) known by the content management system 110 to allow the content management server 110 to locate the user preferences in the DOM by searching for the predetermined identifier. In Example A, the tag ID is "userContentAdsPreferences." Other tag IDs may be used.

Example A

. . .
    <body style="margin: 0pt 0pt 0pt 0pt">
    <div id="userContentAdsPrefences" style="visibility: hidden;">
    <span id="disableVideoAds" style="visibility: hidden;">true</span>
    <span id="maximumNumberOfStaticImageAds" style="visibility: hidden;">3</span>
    <span id="maximumNumberOfAnimatedImageAds" style="visibility: hidden;">1</span>
    </div>
. . .
    <form name="aspnetForm" method="post" action="default.aspx" id="aspnetForm">
. . .

Additional tags (second tags) may be provided to specify each (or a portion) of the provided user preferences. For instance, the browser 107 may render one or more <span> tags (or any other suitable HTML tag identifier or other tag identifier) following the <div> tag. Each of the second tags may represent one or more corresponding preferences of the provided user preferences. Each of the second tags may have a predetermined identifier known by the content management system 110 to allow the content management system 110 to locate or otherwise access the corresponding preferences of the provided user preferences. In Example A, the second tags include the following illustrative (non-limiting)

identifiers: "disableVideoAds" (corresponding to a user preference to disable video advertisements), "maximumNumberOfStaticImageAds" (corresponding to a user preference for a maximum of three static image advertisements per page), and "maximumNumberOfAnimatedImageAds" (corresponding to a user preference for a maximum of one animated image advertisement per page). The second tags may include values (e.g., numerical value, true/false, etc.) that may represent an input of the user for the corresponding preferences. Thus in Example A, the rendered <span> tags indicate that the user elected in the content preference menu 200 of the browser 107 to disable all video advertisements, limit static (non-moving) image advertisements to three per page, and limit animated image advertisements to one per page.

In various implementations, when the resource 105 is requested by the browser 107, the content management system 110 receives a request for content (one or more content items) to be provided with the resource 105. The request for content can include the preference data (having the predetermined format) that corresponds to the user preferences to allow the content management system 110 to process the user preferences. For instance, the content management system 110 may be configured to search for the first tag (e.g., <div> tag) having the predetermined identifier (e.g., "userContentAdsPreferences") in the DOM of the resource 105. Accordingly, the content management system 110 may extract the user preferences from within the first tag (e.g., as provided within each of the <span> tags).

Using the preference data included in the request for content, the content management system 110 can select one or more content items that are eligible ("eligible content item(s)" or "candidate content item(s)") to be provided in response to the request for content. For example, eligible content items may include content items having characteristics matching the extracted user preferences. The content management system 110 may then select an eligible content item for each content slot of the resource 105. The selected eligible content item may be received by the browser 107 for presentation to the user on the user device 106 along with the resource 105. In some implementations, the selected content item may be delivered to the browser 107 via the one or more content servers 114.

In some implementations, the content management system 110 may, in certain circumstances, select one or more content items that are in contrast to or otherwise do not match the provided (stored) user preferences. That is, selecting one or more content items based on the user preferences may be optional. For instance, the content management system 110 may select a content item that does not meet the user preferences if no (or too few) eligible content items meet the user preferences. It should be noted that in some implementations, the user preferences are just one factor of many factors (e.g., relevance of content to page, CTR, predicted CTR, CPC, etc.) for selecting content items. In some implementations, the content management system 110 may disregard some or all of the user preferences (e.g., not select one or more content items based on some or all of the user preferences) if the user preferences restrict the amount of eligible content items by a predetermined amount or factor. For example, the content management system 110 may be configured to disregard user preferences that restrict the number of eligible content items to fewer than five percent (or other percentage) of all content items that would otherwise be available for selection but for the user preferences or less than a predetermined quantity (e.g., 50, 500, etc.) of eligible content items. In some implementations, the content management system 110 may disregard some of the user preferences such that the remaining user preferences (i.e., the user preferences that are not disregarded) do not restrict the amount of eligible content items.

In some implementations, the user preferences may be prioritized (e.g., by the user and/or the content management system 110) such that user preferences of low priority are disregarded before user preferences of high priority. For example, the user may provide in the content preference menu 200 (or the like) that a preference that a video advertisement not be shown has priority over other preferences (e.g., setting maximum number of static image advertisements). Accordingly, the user's preference for, for example, maximum number of static image advertisements may be disregarded before the user's preference for no video advertisements.

Figure 3:
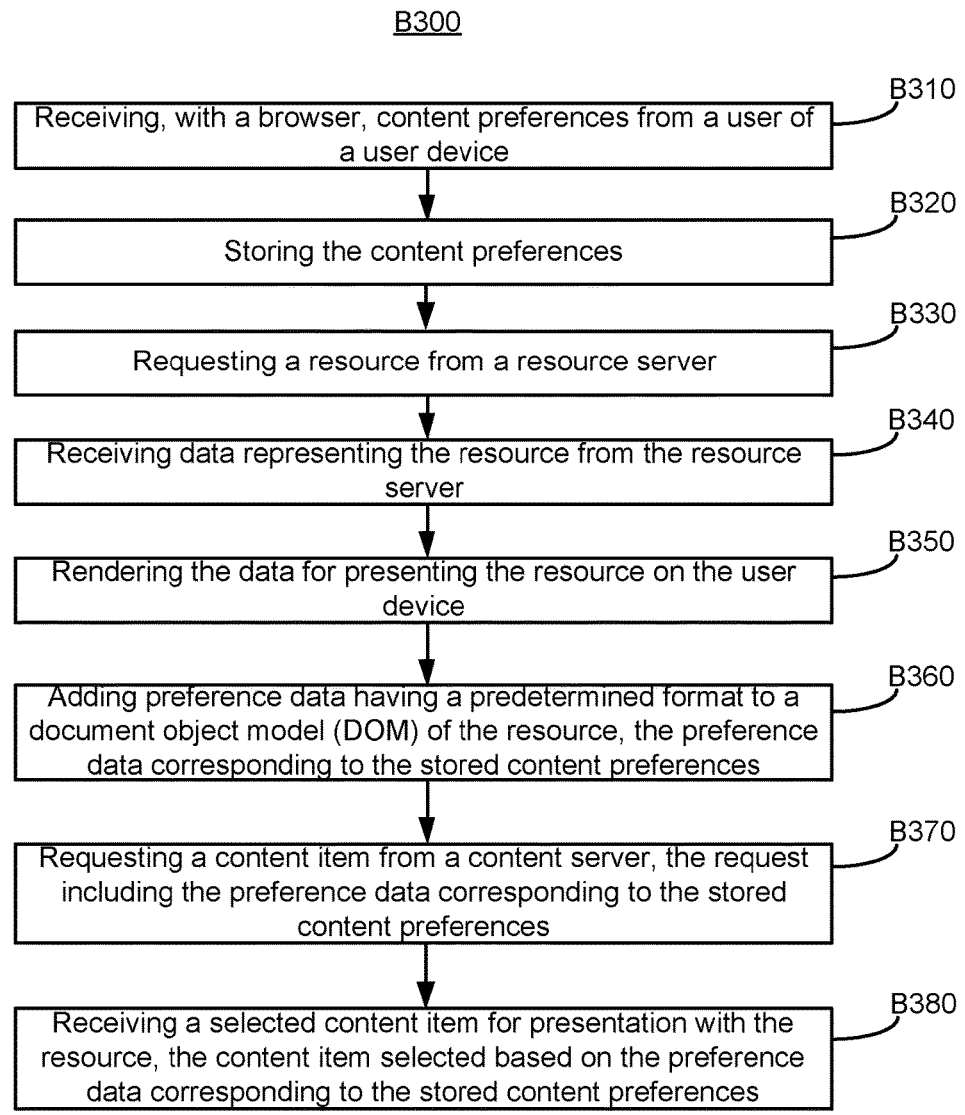
FIG. 3 is a flowchart of a method for managing content according to various implementations of the disclosure.

FIG. 3 illustrates a method B300 of managing content according to various implementations. With reference to FIGS. 1-3, the method B300 may be implemented, for instance, on the web browser 107 on the user device 106. At block B310, the browser 107 may receive content preferences from a user of the user device 106 via the browser 107. At block B320, the browser 107 may store the content preferences (e.g., on the user device 106).

At block B330, the user may cause the browser 107 to request a resource 105 from a resource server (e.g., 104). At block B340, the browser 107 may receive data representing the resource from the resource server. At block B350, the browser 107 may render the data for presentation on the user device 106. At block B360, the browser 107 may add preference data having a predetermined format to a document object model (DOM) of the resource 105. The preference data may correspond to the stored content preferences.

At block B370, the browser 107 may request one or more content items from a content server (e.g., the content management system 110 and/or the content server 114). The request for content item(s) may include the preference data corresponding to the stored content preferences. At block B380, the browser 107 may receive, from the content server, a selected content item (e.g., corresponding to block B440) for presentation with the resource 105 on the user device 106 (e.g., on the browser 107). The content item may be selected based on the preference data, which corresponds to the stored content preferences, for example, as in the DOM of the resource 105 (e.g., corresponding to block B430).

Figure 4:
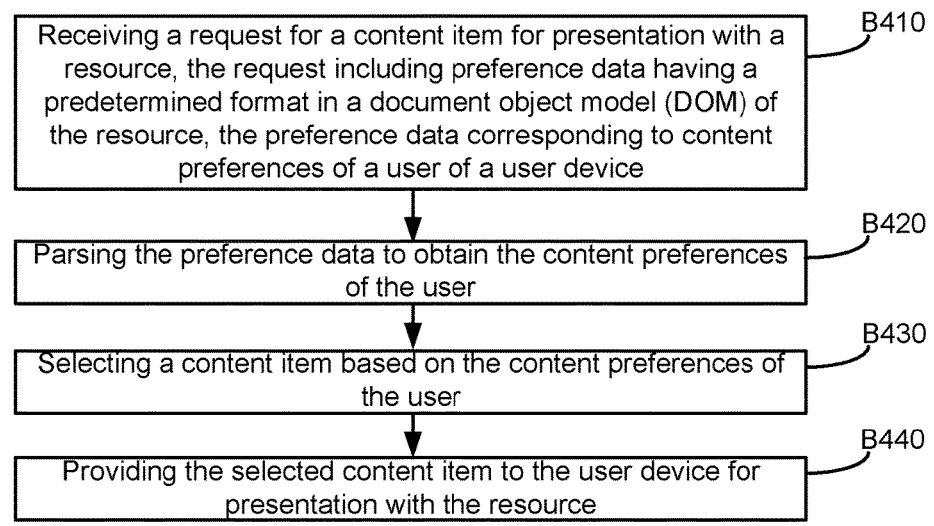
FIG. 4 is a flowchart of a method for managing content according to various implementations of the disclosure.

FIG. 4 illustrates a method B400 of managing content on a server according to various implementations. With reference to FIGS. 1-4, the server on which the method B400 is implemented may be, for instance (but not limited to), the content management system 110 and/or the content server 114. At block B410, the server may receive a request (e.g., corresponding to block B370) for one or more content items for presentation with a resource 105. The request for the content item(s) may include preference data. The preference data may have a predetermined format in a document object model (DOM) of the resource 105. The preference data may correspond to content preferences provided into a browser 107 by a user of a user device 106. At block B420, the server may parse (e.g., extract) the preference data to obtain the content preferences of the user. At block B430, the server may select a content item based on the content preferences parsed from the preference data. At block B440, the server may provide the selected content item for presentation with the resource 105 on the user device 106 (e.g., on the browser 107).

In some implementations, the user preferences may be provided in advance of requesting a resource (e.g., 105)

having one or more content items that are selected based on the user preferences. In other implementations, the user preferences may be provided in response to requesting a resource (e.g., 105) having one or more content items that are selected based on the user preferences.

In some implementations, the user preferences are provided by the browser 107 as part of an HTTP request sent to the website 104 and/or the content management system 110. The content management system 110 may be configured to implement JSP (JavaServer Pages) or ASP.NET to access the HTTP request and obtain the user preferences. In other implementations, the HTTP response may be modified by the browser 107 to include the user preferences.

In some implementations, the browser 107 may be configured to detect and filter forged tags such that the forged tags are not rendered into the resource 105. The forged tags, for instance, may be added by a publisher (or the like) of a page to attempt to fake the system 100 into believing that such tags represented user preferences for content items. For instance, because the user preferences are added to the rendered page by the browser 107, the user preferences should not be in data representing the page when received from the website 104 of the page. Thus, for example, the browser 107 may be configured to detect and filter tags in the data representing the page received from the website 104 of the page.

In various implementations, the browser 107 is configured to receive the user preferences for content items. In other implementations, any other suitable program or application (including mobile applications) may be configured to receive the user preferences, for example, in a menu within such suitable program or application.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A system for document object model (DOM) data extraction using a hypertext markup language (HTML) tag identifier, comprising:

a computing device comprising one or more processors and memory; and a web browser that executes on the computing device and is configured to:

receive, for the computing device, content preference data input via a content preferences menu of the web browser;

add, to a DOM of an electronic resource, the HTML tag identifier to indicate the content preference data received for the computing device via the content preferences menu;

detect a forged tag established by a provider of the electronic resource;

filter out the detected forged tag to prevent the forged tag from being rendered with the electronic resource;

render, without the detected forged tag, the electronic resource with a content slot and the HTML tag identifier added to the DOM of the electronic resource, wherein the HTML tag identifier is rendered in a predetermined format for parsing by a content server, the content server configured to:

receive, from a script executing on the electronic resource, the HTML tag identifier, the script configured to:

parse, subsequent to the web browser rendering the electronic resource, the electronic resource;

identify, responsive to parsing the electronic resource, the HTML tag identifier in the predetermined format; and transmit, to the content server, the HTML tag identifier;

select, for the content slot responsive to receipt of the HTML tag identifier from the script, a content item using the content preference data indicated by the HTML tag identifier and input via the content preferences menu of the web browser executed by the computing device, the content item provided by a content provider device different from the computing device and the content server, and transmit, to the computing device via a computer network, the content item;

the web browser further configured to:

receive, from the content server via the computer network, the content item selected by the content server; and render, for display on a display device of the computing device, in the content slot, the content item received from the content server via the computer network.

2. The system of claim 1, wherein the web browser is further configured to:

receive, via the computer network, date representing the electronic resource, the data including content slot data specifying a content slot of the electronic resource.

3. The system of claim 1, wherein the web browser is further configured to:

retrieve, from memory, the predetermined format for the HTML tag identifier.

4. The system of claim 1, wherein the web browser is further configured to:

add the HTML tag identifier comprising a <div> tag.

5. The system of claim 4, wherein the HTML tag is a first HTML tag and the content preference data comprises a data structure with a plurality of preferences, the web browser further configured to:

add, subsequent to the first HTML tag identifier comprising the <div> tag, a second HTML tag identifier indicating a preference of the plurality of preferences, the second HTML tag identifier comprising a <span> tag.

6. The system of claim 1, wherein the HTML tag is a first HTML tag and the content preference data comprises a data structure with a plurality of preferences, the web browser further configured to:

add the first HTML tag identifier comprising a <div> tag;

add, subsequent to the first HTML tag identifier comprising the <div> tag, a second HTML tag identifier indicating a first preference of the plurality of preferences stored in the data structure, the second HTML tag identifier comprising a <span> tag, the first preference to disable video content.

7. The system of claim 6, wherein the web browser is further configured to:

add, subsequent to the second HTML tag identifier, a third HTML tag identifier indicating a second preference of the plurality of preferences stored in the data structure, the third HTML tag comprising a value that indicates a maximum number of static image content items.

8. The system of claim 6, wherein the web browser is further configured to:

add, subsequent to the second HTML tag identifier, a third HTML tag identifier indicating a second preference of the plurality of preferences stored in the data structure, the third HTML tag comprising a value that indicates a maximum number of animated content items.

9. The system of claim 1, wherein the web browser is further configured to:

transmit, via the computer network, a request for content from the content server.

10. The system of claim 1, comprising:

the content server comprising at least one processor to search, responsive to a request for content, for the HTML tag identifier in the predetermined format rendered in the DOM of the electronic resource.

11. The system of claim 10, wherein the content server is further configured to:

extract, based on the search, the content preference data from the HTML tag identifier rendered in the DOM of the electronic resource; and use the content preference data to select the content item.

12. The system of claim 1, wherein the HTML tag identifier indicates content preference data comprising a type of content item, the type comprising at least one of an image, a video, animated image, or text.

13. A method of document object model extraction with a hypertext markup language (HTML) tag identifier, comprising:

receiving, by a web browser that executes on a computing device comprising one or more processors and memory, content preference data for the computing device input via a content preferences menu of the web browser;

adding, by the web browser, to a document object model (DOM) of an electronic resource, the HTML tag identifier to indicate the content preference data received for the computing device via the content preferences menu, the HTML tag identifier in a predetermined format;

detecting, by the web browser, a forged tag established by a provider of the electronic resource;

filtering out, by the web browser, the forged tag to prevent the forged tag from being rendered with the electronic resource;

rendering, by the web browser, without the detected forged tag, the electronic resource with a content slot and the HTML tag identifier added to the DOM of the electronic resource, wherein the HTML tag identifier is rendered in a predetermined format for parsing by a content server, the content server configured to:

receive, from a script executing on the electronic resource, the HTML tag identifier, the script configured to:

parse, subsequent to the web browser rendering the electronic resource, the electronic resource;

identify, responsive to parsing the electronic resource, the HTML tag identifier in the predetermined format; and transmit, to the content server, the HTML tag identifier;

select, for the content slot responsive to receipt of the HTML tag identifier from the script, a content item using the content preference data indicated by the HTML tag identifier and input via the content preferences menu of the web browser executed by the computing device, the content item provided by a content provider device different from the computing device and the content server, and transmit, to the computing device via a computer network, the content item;

receiving, by the web browser, from the content server via the computer network, the content item selected by the content server for presentation in the content slot of the electronic resource; and rendering, by the web browser, for display on a display device of the computing device, in the content slot, the content item received from the content server via the computer network.

14. The method of claim 13, comprising:

receiving, by the web browser via the computer network, data representing the electronic resource, the data including content slot data specifying a content slot of the electronic resource.

15. The method of claim 13, comprising:

retrieving, by the web browser from memory, the predetermined format for the HTML tag identifier.

16. The method of claim 13, comprising:

adding, by the web browser, the HTML tag identifier comprising a <div> tag.

17. The method of claim 13, wherein the HTML tag is a first HTML tag and the content preference data comprises a data structure with a plurality of preferences, comprising:

adding, by the web browser, subsequent to the first HTML tag identifier comprising the <div> tag, a second HTML tag identifier indicating a preference of the plurality of preferences, the second HTML tag identifier comprising a <span> tag.

18. The method of claim 13, wherein the HTML tag is a first HTML tag and the content preference data comprises a data structure with a plurality of preferences, comprising:

adding, by the web browser, the first HTML tag identifier comprising a <div> tag;

adding, by the web browser, subsequent to the first HTML tag identifier comprising the <div> tag, a second HTML tag identifier indicating a first preference of the plurality of preferences stored in the data structure, the second HTML tag identifier comprising a <span> tag, the first preference to disable video content.

19. The method of claim 18, comprising:

adding, by the web browser, subsequent to the second HTML tag identifier, a third HTML tag identifier indicating a second preference of the plurality of preferences stored in the data structure, the third HTML tag comprising a value that indicates a maximum number of static image content items.

20. The method of claim 18, comprising:

adding, by the web browser, subsequent to the second HTML tag identifier, a third HTML tag identifier indicating a second preference of the plurality of preferences stored in the data structure, the third HTML tag comprising a value that indicates a maximum number of animated content items.

\* \* \* \* \*